United States Patent [19]
Rocklin

[11] 3,969,601
[45] July 13, 1976

[54] ELECTRONIC SPARK TREATING AND ERODING METALS

[76] Inventor: Isadore J. Rocklin, 3240 Douglas St., Sioux City, Iowa 51104

[22] Filed: Aug. 6, 1973

[21] Appl. No.: 386,189

Related U.S. Application Data

[63] Continuation-in-part of Ser. No: 130,734, April 2, 1971, abandoned.

[52] U.S. Cl. .............................. 219/69 G; 219/69 C
[51] Int. Cl.² ............................................ B23P 1/08
[58] Field of Search ................. 219/76, 69 C, 69 P, 219/69 S, 113, 69 G, 69 V; 204/143; 320/1; 310/70

[56] References Cited
UNITED STATES PATENTS

| | | | |
|---|---|---|---|
| 2,539,439 | 1/1951 | Kumler | 219/69 V |
| 2,730,602 | 1/1956 | Porterfield | 219/69 V |
| 2,922,021 | 1/1960 | Morris | 219/69 V |
| 3,024,406 | 3/1962 | Porterfield | 219/69 C |
| 3,254,195 | 5/1966 | Phillips et al. | 219/69 C |
| 3,396,259 | 8/1968 | Easton | 219/69 V |
| 3,549,851 | 12/1970 | Hockenberry | 219/69 P |
| 3,555,235 | 1/1971 | Darrow et al. | 219/76 |
| 3,567,604 | 3/1971 | Bodine | 204/143 R |
| 3,607,689 | 9/1971 | Inoue | 204/143 R |
| 3,612,810 | 10/1971 | O'Connor | 219/69 G |
| 3,624,338 | 11/1971 | Ellis | 219/69 C |
| 3,666,906 | 5/1972 | Byrne | 219/76 |
| 3,806,691 | 4/1974 | Roach | 219/69 G |

*Primary Examiner*—Bruce A. Reynolds

[57] ABSTRACT

A machine used differently for various machining functions utilizing either the electronic spark erosion of metals, or electronic spark emission surface treatment of metallic material. The machine includes a novel means for monitoring and controlling the electrode position, with relation to the work piece. The machine is constructed to readily allow: various electrical component use changes; mechanical changes in axis and angularity of work head for optimum electrode positioning; electrical polarity changes together with vibratory mechanical electrode activation resulting in significant spark working activity. An electrical circuit provides resistance-capacitance for spark power generation incorporating reserve capacitance power pulsing for extra sparking capability. A machine: composed of easily maintainable modular segments allowing interchangeability by incorporation or deletion of sections. A machine providing portable adaptability for various types of work to be used completely or in sections.

14 Claims, 9 Drawing Figures

INVENTOR.
Isadore J. Rocklin
BY
His Att'y.

INVENTOR.
Isadore J. Rocklin
BY
His Att'y.

ELECTRONIC SPARK TREATING AND ERODING METALS

CROSS REFERENCE TO RELATED APPLICATION

This application is a continuation-in-part of my co-pending application Ser. No. 130,734 filed Apr. 2, 1971 abandoned.

BACKGROUND OF INVENTION

The work capabilities of the electric spark are well known. Atmospheric lightning is an example of the destructive power of ungoverned sparking capabilities.

The use of the spark to melt metal is a well known art. The creation and utilization of electric sparks for certain productive uses as well as the control of its power and regulation of its operation is also well known in the art.

I briefly describe its action and calculation of its results. The circuit and the switching arrangement allow a cumulative capacity addition such as is found in all parallel capacitance circuits. The formula for capacity of capacitors as they are added is: $C$ (total) $= C_1 + C_2 + C_3 + C_4 \ldots$ Some scientific research which relates to my process for which I am seeking a patent is evident.

I cite basic scientific theory of: work, energy, ionization, spark discharge, etc.

Energy stored in condenser (Farad) $CE^2$ or $$(\text{Farad}) \frac{\text{Capacity} \times \text{Volts}^2}{2}$$

$$\text{Capacity in Mfd} = \frac{C (\text{Mfd}) \times E}{2 \times 10^6}$$

$$\text{Energy Stored (Joules)} = \frac{5 \times 67}{2 \times 1,000,000}$$

From the occurance of a spark when a condenser (Leydon Jar) is discharged it may be inferred that the capacitor (Jar) has energy stored in it. Whenever a condenser (Conductor) is discharged, work is being done, a strict measure of which is the energy dissipated in the form of heat, or otherwise, when the current flows. It is possible to calculate the energy associated with any charge when we know the potential at the place occupied by the charge.

This energy is available to produce the current when the condenser (Conductor) is discharged. In most cases it appears entirely in the form of heat in a wire or electrode carrying the current, or in the case of spark discharge, owing to the high temperature, light and also sound may produce.

In practice, it is useful to have a unit of capacity founded upon the volt and coulomb. This capacity such that a charge of 1 coulomb raises the potential to 1 volt is said to be 1 farad. (farad = $10^6$ microfarads) The farad is founded on the electro magnetic system of units, being derived from the volt and ampere. There is a relation between this unit and the electro static unit of capacity. 1 farad = $9 \times 10$ electro units of capacity.

Whenever a charge of electricity is situated in an electrical field it experiences a force. When a charge is allowed to move in the direction of force, work is done upon it. The law of inverse square holds. Hence, a positive charge experiences a force tending to drive it from points of higher to points of lower potential. We define the difference in potential between the two points as the work done in moving a positive charge from one point to the other. Thus the difference of potential is measured in ergs per unit charge.

Air, as a rule, is a non-conductor, but for a very strong electrical field this ceases to be the case and air becomes a conductor. Liquids likewise have various conductive capabilities.

When a positive charge is placed on a capacitor its potential is raised.

In certain cases it is possible to calculate the charge of a capacitor produced by placing a given charge upon it. There is a definite relation between the charge and the potential produced by the charge. The ratio of the charge placed upon a capacitor to the potential produced by that charge, is the capacity of the capacitor. Thus, if $C$ is the capacity, $Q$ the charge, and $V$ is the potential, the capacitor due to that charge then $C = Q/V$. Where condensers are joined in parallel, the resulting capacities are the sum of the separate capacities.

I describe a quantity of electricity which passes. When 1 ampere flows for one second, it is called a coulomb. A coulomb is the practical unit of quantity of electricity upon the same system as that upon which the ampere, volt, and ohm were devised.

Electric spark arc space between two conductors may become conductive. With air at atmospheric pressure, the difference of potential that must exist between the conductors before any current passes is considerable. It depends upon the difference apart of the conductors and also upon their shape.

At first, a faint hissing sound is heard and in the dark, a faint violet colored glow can be seen. This is called a *Brush Discharge*. Upon further raising the potential or approximating the conductors closer together or nearly in contact, a point is eventually reached in which a sudden crackling discharge takes place. This consists of a singular or a succession of discharges, each one being accompanied by a luminous streak of light to form almost exactly like a flash of lightning. This is called *Spark Discharge*. Spark Discharge also occurs upon contact with and of the conductors transferring the work capabilities relating there to the various conducting bodies.

The quality, intensity, frequency, and rechargeability of the spark producing capabilities in the electrical circuit with its related work producing capabilities utilizing new electronic circuitry and new mechanical designs together with other unique related features in certain aspects of metal treatment, is the object of my invention.

To create and control the electronic generation of sparks and to regulate the electrode, its position, and its interaction with metal is covered in two phases of this invention.

One approach covered is the use of the produced, controlled, regulated and monitored emitted spark and its interaction with contacted metal in the presence of the earth's atmosphere. In this manner, the created spark is discharged to contact the metal. A resultant surface eruption of the metal exists. The carrier of the spark from the spark generator to the work piece is an electrode. The quality of the spark, the consistency of the electrode, the mode of application, and the material of the work piece all contribute to this interaction relationship.

Work pieces so treated accordingly act in different manners. One can treat work pieces such as seaming chucks and rolls for can manufacture such that the surfaces are hardened to give longer wear life. Automotive engine valves and other cylindrical or round surfaces can be so treated. In addition, contoured or flat surfaces of varying width and breadth such as tools and dies can be so treated to change the metallic surfaces resulting in better performance. Softer metals can be so treated to give surface strength for varying work results.

Conversely to the use of the spark in atmospheric gases, one can utilize the productive power of a created, controlled, regulated, and modulated spark for spark erosion of electrically conductive material in a liquid medium. The interaction and work results of the spark, the electrode and the work piece is completely different from the above described air treated process. Thus, electric spark discharge in a liquid results in the process known as Electrical Discharge Machining and has many ramifications for use and utility. Some uses for this process are in tool and die manufacture, and for broken tap removal, surface honing, etc.

The above sets out two different methods of use of the generated spark in one unit or components which constitute this particular invention, using similar electronic and mechanical equipment and is new in the art. Its utility is in the specific adaptation to a unique and new unit of manufacture and process of utilization as a working machine.

In this invention new and novel specific components, units of manufacture and use, as well as new fundamental machine design and new electrical circuits with its new electro-mechanical responsive elements are set out which have adaptations to increase the effectiveness, efficiency, and economics of electric spark discharge work capabilities, all incorporated in one working model machine.

SUMMARY OF INVENTION

This invention pertains to electrically eroding and/or metal treating electrically conductive materials by means of universal-axial positioning mechanical vibrating electrode combined with a reserve power spark discharge electrical circuit having a higher sparking capacity than found with previous resistance-capacitance, power pulsing or frequency variation electrical circuits.

The modular components provide separate utility capabilities whereby elements of this machine can be used as a whole or in conjunction with other machines while still functioning as an electrical sparking machine. A novel system of controlling and monitoring the spark discharge relative to the metal is provided. A unique new mechanical positioning means for the electrode to accomplish certain work is described.

Electrical spark discharge as a method of treating work pieces is finding wide new uses in industry. In my U.S. Pat. No. 3,524,956 I demonstrated this action as a means of treating the surface of a metal. In my abandoned application Ser. No. 76,084 filed Sept. 28, 1970, which prior to abandonment became a continuation-in-part application Ser. No. 271,388 dated July 13, 1972 now issued as U.S. Pat. No. 3,763,373, I also describe a means, method, and electrical circuit for surface treating a metal, or composite of powdered metals, by means of an electronically charged arc. In my pending application Ser. No. 332,216 dated Feb. 13, 1973 for which allowance of Patent has been advised I describe a device and method of applying an electrode either for surface treatment, or electrical erosion of metal of a work piece using a simple visual spark monitoring element to depict the optimum utility of a spark metal working process either in a gaseous or liquid element and showing various mechanical adaptations of merit.

These related inventions described other circuitry and mechanical activation for sparking purposes for metal treatment. The mechanical and electrical working machine capabilities now set out as is shown herein are of a different nature for a complete combined modular or component combination manual and power activated metal treatment machine.

Variations of surface treatment of metal causing a spark discharge in the presence of a dielectric liquid will result in the spark erosion of metal, so it is possible to machine electrically conductive material to a given shape, or electrically hone metal surfaces, or to erode unwanted metal such as broken taps, screws, or the like from a work piece. It is possible to control this work to close tolerances and finishes.

With my invention I provide a machine capable of varying uses including metal erosion and metal treatment. The electrical circuit which powers the machine provides the selective utilization of a bank of working condensers, and a singular or multiple bank of reservoir condensers to instantaneously recharge the working condensers such that a quicker and stronger spark discharge with significantly greater arcing capacity is achieved. The mechanical vibration of the electrode and its resultant movement in connection with the work piece causing more spark discharge, adds to this unique work producing capability. In fact, as a spark erosion machine so large is the arcing capability of my machine with its unique electrical circuit reserve power capabilities, coupled with the mechanical electrode action, that its resultant cubic inch cutting and machining capabilities for metal erosion output have been compared with the work capabilities of machines whose amperage output is many times as much as mine, and whose size and cost relate to the larger equipment requirements with its larger electrical current needs and extra wiring, extra machine component, and larger size requirements.

My modular design of a unit allows it to be used as a complete spark discharge machine to act as a whole, yet alternately allowing various components to be used separately for other machining functions. Certain units can be deleted yet the spark action is accomplished. This capability is achieved by using separate units housing their own circuits, or portions of the circuit, so that a combination of power or lesser power use to achieve coarse or fine finish, can be achieved by simple switching. Further, if one wants metal air surface treatment, one merely switches off the pump which provides the dielectric. As another example, if one does not want the power drive to the electrode use of this component, it can be switched off or even omitted. If the basic arcing unit without the fine finish control is desired, this separate fine finish component is not utilized. It allows the greatest utility combined with economy and work capabilities to suit the work at hand.

For electrical discharge machining, in the presence of a dielectric providing sparking action, a variety of cutting capabilities are supplied from the use of only the basic spark generating unit and work head with the electrode to provide adequate erosion capabilities because of the constant sparking reserve capacity spark generation. This basic unit includes the control box giving arc control, power control, polarity changing and the mechanical electrode activation. The dielectric fluid in operation becomes dark and visual observation of the arcing action of the electrode in the work tank under liquid cannot be observed. The control box incorporates a visual arc action monitoring meter. By means of this meter observation control the monitoring of the cutting action of the electrode is achieved.

Modular construction allows further new useful machining capabilities. In an electrical discharge spark erosion machine the electrode working section including the work head, without work stand, but with work tank section, can be physically removed from the electrical component stand and the work head can be secured by means of the same work stand whole using the chuck of other equipment such as mounted in and on a vertical milling machine. The extended power cable from the spark generating unit powers the electrode.

Thus, precision automatic axis movement control which is built into these more sophisticated and more complex separate types of metal working machines can be utilized in this manner to extend their uses with economy. The erosion machine work tank is simply fastened to the milling machine table for this added machine function, while the fluid hoses, pump, and reserve fluid tank are likewise moved and used.

The simple work stand using a work base support consisting of a singular round work vertical head standard support, allows a novel wider range of height, axis, and angularity for positioning of the electrode reference to the work piece. The work head as a whole can be readily moved up or down on the round support shaft for height adjustment. The work head can be swung on this round shaft to almost 180° for widest area electrode positioning. The back and forth positioning of the electrode is simply accomplished. If an angle other than lateral, horizontal, or vertical ($x$, $y$, $z$) axis is desired, the electrode holder has a new and unique swivel ball positioning holder allowing a new means of cutting variatons from these axis so that an angular hole from the three axis can be eroded. An added feature is the use of the alternate manual feed or powered feed electrode holder coupled with the micrometer feed screw of the electrode holder. (A rack and pinion and other movement means can likewise be utilized.) This allows universal electrode positioning and electrode feed capabilities. All of these features in a compact precision electrical sparking unit operating completely or separately as a machine with its many newly created advantages unique in this field.

In a sparking machine, controlling the advance or retraction of the electrode for fastest arcing action or most accurate motion is most desirable. With my invention, I can either accomplish this by means of a hand screw feed electrode control or by means of quick engaging mechanical clutch and using a motor operated power drive. In addition, if one only wants less physical electrode action and utilize the arcing capacity without the vibrating electrode for a special type of work, this vibrator action is controlled by a separate switch which allows its activation or inactivation. Similarly, treatment of different metal shapes of metals or rate of electrode wear control is provided.

I have not set out the means of automatic power controlling or changing the position of the work head which would propel the electrode position in the $x$, $y$, or $z$ axis so as to achieve certain work capabilities. By so powering in controlled speed or feed increments lineal motion, I can change the electrode position by means of activating the work head position in any one or all of the horizontal, lateral, or vertical planes. I have likewise not set out the various work positioning power moving means. My design shows the basic mechanical functions for such movement changes. A technician skilled in electronics and mechanical motions such as selsyn motor drives, simple speed controlled motors, stepping motors or the like, can activate the movement in a plane or contour of the electrode holder position reference to the main support shaft such that in surface spark treatment for coating of a metal, the needed motion of the electrode relative to the surface can be altered automatically as desired by such separate powering and control means. Similarly, if one were to linealy spark surface treat the circumference of a round part, a separate rotating drive unit can be used to revolve the part. Further, a lineal feed mechanism can be imparted to the work piece.

In a dielectric as in the air, sometimes the rate of electrode wear is controlled by means of the varying of polarity, which is accomplished with the simple polarity switching arrangement such that the electrode charge can be positive or negative as desired, as can the polarity charge affect the work piece. To allow this polarity reversal and to delete the element of machine frame grounding I have also included electrical insulated material as holding elements in the main electrode support head and guide bar holders as well as utilized an electrically insulated work tank material. The dielectric storage tank is electrical polarity insulated by the use of the insulated fluid supply hose materials to the work tank. The base of the tank can be placed on electrical insulating material. The electrically insulated head positioning holding material is of a mechanical nature to provide free sliding bearing surfaces as an additional mechanical machine advantage.

The object of my invention is optimum surface treatment of metal, or cutting erosion of metal by special new circuitry and new mechanical means using a sparking electrode. The ability to properly and constantly position the electrode to utilize the unique electrical circuitry with maximum mechanical advantage structure lies in the ability to monitor the arcing capabilities. I accomplish this in my basic unit invention through the visual display meter showing the required current draw, or voltage indication, such that the rate of feed can always be maintained at the precise control rate, the arcing contact and usage of the electrode using the hand feed for manual operation.

In my electronic circuitry I can use electrical servo monitoring and/or electronic relating sensing circuits for triggering responses, or variations of the well known circuit incorporating the Schmitt Trigger to accomplish many variations of electronic switching action for a variety of needs and purposes. I can also use a means of varying the frequency of vibration of the electrode changing its mode of motion, or changing the stroke of the electrode. I can further use a multiplicity of electrodes or means of electrode contacting elements, or multiplicity of heads, or variety of movements relative to the work to achieve the set out purposes.

In addition to the manual control and visual meter observation, I can use a variety of means of powering the feed screw drive motor to show or relate the functions cooperatively with the visual meter activation, providing the sparking electrode positioning to the work. One simple method is to utilize a direct current reversing directional motor which is manually clutch coupled through a belt, chain, or gear drive with the shaft of the feed screw. In this device, the motor speed can be varied by means of the simple electrical component to supply rectified A.C. current through a potentiometer to the reversible speed D.C. motor.

As explained in my original application, I can also "use other electronic devices to sense the variables and then providing that such device, control a motor or the like to control the advance of the electrode." One such device to actuate the electrode movement through a related switching arrangement uses the monitoring meter as a physical and electrical basis incorporating a dual needle position switching activation attachment which is set for optimum arcing on the face of the dial of the meter. The power of the feed motor is activated by the related position of the meter needle showing arcing electrode current or voltage through opto electronics, (including if desired, Schmitt Triggering or amplifier or proximity sensing) to actuate the switching device. This device basically incorporates maximum and minimum meter needle setting positions. When the requirements are known for meter needle positions, the device is so set for the optimum cutting ranges so that as the meter needle swings higher in the dial scale, past the maximum control setting, a switching action occurs so that the motor powering the electrode feed screw is reversed, or delayed, or arcing action changed, or shut off. Then when this arcing action is reduced or changed to a slower pace, the master meter needle automatically swings lower in the dial scale as set for the minimum position and the switching for change of motor speed and direction is accomplished and the advance of the feed screw power is again activated. Thus, a unique means of meter needle oscillating monitoring provides continuous control of electrode positioning giving optimum automatic arcing control. The reverse and advance feed rate relating to motor speed can also be changed in this manner by elements of resistance so that a fast withdrawal can be made when the circuit between the electrode and work piece is not proper.

Figure 8:
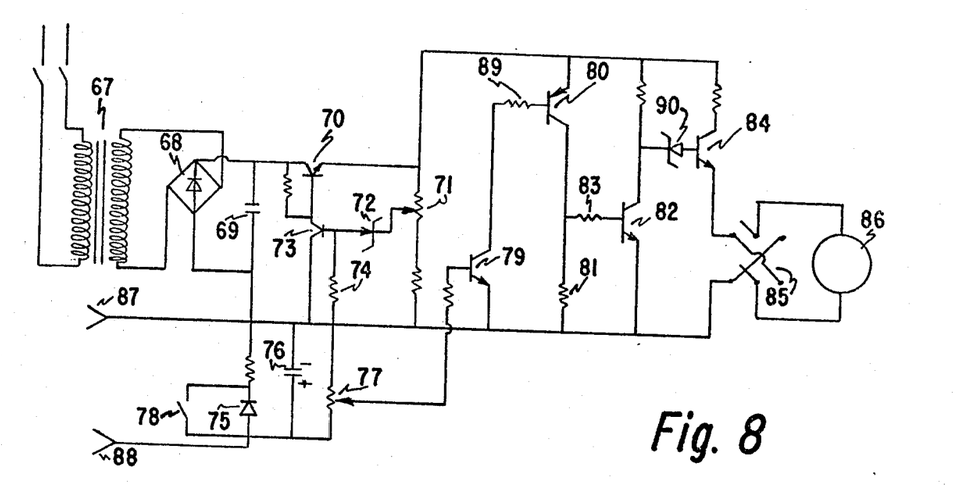
FIG. 8 is an electronic circuit for monitoring and controlling the electrode position by means of current sensing to drive the motor.

To more fully describe my previously related means for sensing or monitoring as noted in my previously related co-pending Ser. No. 130,734 application now abandoned. stating, "By using an electronic device to sense the variable and then providing that such device control, a motor or the like, to control the advance of the electrode, " I have added a drawing showing electrical circuits listed as FIG. 8 and FIG. 9. FIG. 8 shows a circuit for another means of achieving current sensing of the variables, which likewise electrically acts to power the feed screw motor drive mechanism to give the desired motor action, speed, rotation directional changes, and power activation necessary to maintain optimum arcing of the electrode with reference to the work.

Figure 9:
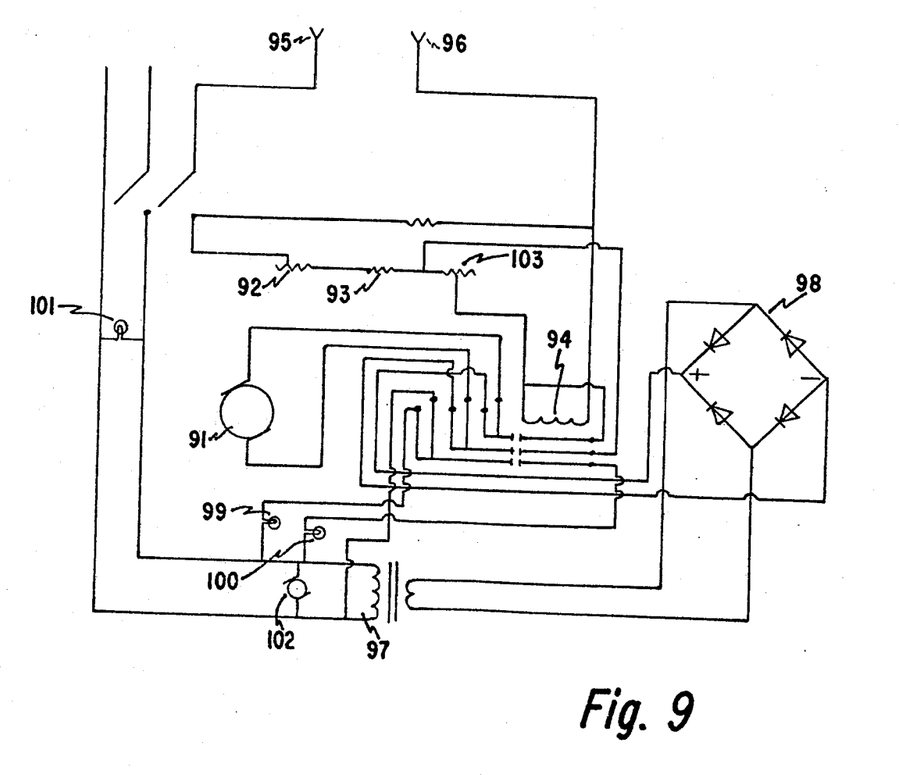
FIG. 9 is an electronic circuit for monitoring and controlling the electrode position by voltage sensing variations.

A further control mechanism as shown in FIG. 9 relating to the electrode activation is by means of a novel sensing relay arrangement so that when the electrode is electrically shorted to the work piece, thereby changing current and/or voltage, the motor rotation is reversed. In this arrangement of activation of the motor coupled with the feed screw to the electrode, the reversal speed can be accelerated to quickly clear the electrode short. When this is done, the circuitry is such that the feed screw rapidly retracts clearing the increased electrical draw of the electrode in contact with the work piece. After clearance of this objectional position of the electrode, other electrical relay actuation causes the instantaneous controlled advancement of the electrode to perform the work of arcing of the electrode with the metal at the most advantageous rate.

My invention provides a variety of novel features. It allows significant use of electrical arcing reserve power in the electrical circuits. Unique machine design is provided. Unusual flexibility and adaptation of feed screw control exists, visual and electrical monitoring electrode position control means relating to this simple unique new spark causing mechanism are just some of the features. This equipment and its dual purpose metal working processing capabilities are new to industry allowing efficiency, versatility, and economy in machine and work resultants.

DESCRIPTION

Briefly, the invention comprises a device utilizing an electric spark to electrically erode or treat metal. In the absence of a dielectric liquid it surface treats metal. With a dielectric liquid material it erodes, as well as treats metal. The electrode may either be vibrating or still. The control of the electrode advance to and from the work is controlled by means of current or voltage measurement. Simple mechanical adjustments position the plane, axis, and angularity of the electrode. An electrical circuitry incorporates a high capacitance reservoir of electronic charges to activate the working capacitors for more work capabilities. An electrical circuit allowing various modes of adjustable operation to provide a variety of power capabilities for coarse or fine finish control functions while still allowing complete machine capabilities.

Figure 1:
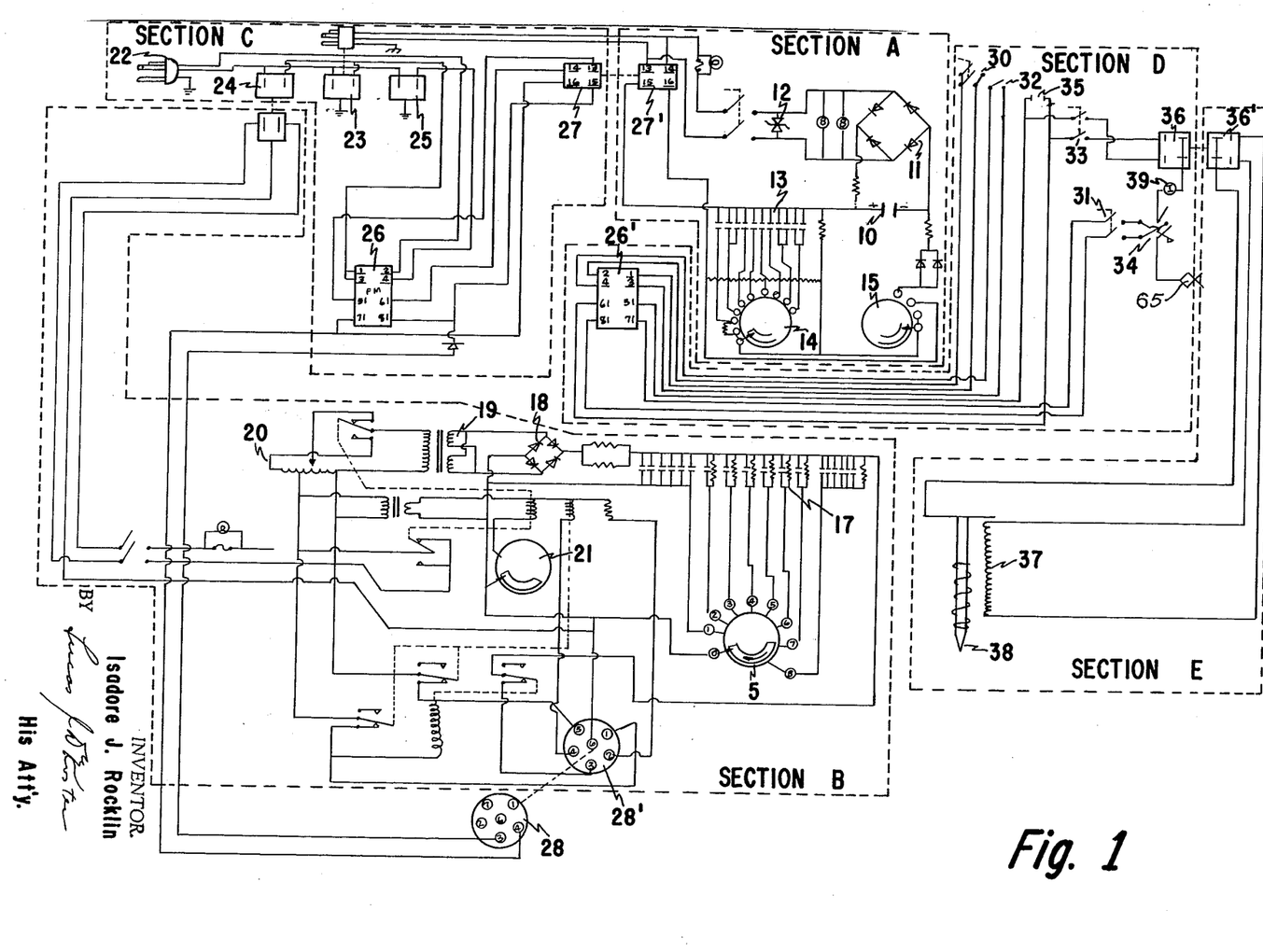
FIG. 1 is the electrical diagrammatical display of the circuitry used in my invention.

More specifically and referring to the drawings, an electronic circuit as shown in FIG. 1 is provided for actuation. In that drawing various portions of the circuit are outlined as follows: Section A is a first power pack electronic spark generating unit; Section B is a second power pack electronic spark generating unit;

Section C is a schematic diagram of the main power box; Section D illustrates the main control panel, and Section E is the electrode holder and vibrator unit. Each of these sections combined in a separate housing can be physically removed, portably mounted, and changed for various machine operation or interchanged for easy maintenance.

Section A, the first power pack, includes a large (about 1650 Mfd) condenser 10 powered by a bridge rectifier 11 which is guarded by an arc suppresser 12. The constantly charged condenser 10 acts as a large reservoir of capacity so that it can quickly recharge a battery 13 of working condensers selectively and cumulatively connected in parallel thus providing a much higher level of charge capacity to be imparted to the cycle of regeneration and frequency of charging impulses to these working condensers which allows the cycle of regeneration to be more quickly reactivated thus providing much more surge power pulsing to be emitted. By selective use of some or all of the bank 13 of condensers controlled by a dial switch 14, a variety of spark discharge quality and quantity is provided from this power pack. A second mode dial switch 15 in this section allows three different modes of operation. The top switch mode engagement position allows selective capacitance use of Section A alone if Section B is omitted or if Section B is shut off. Section A power pack in itself is sufficient for work capabilities. The middle mode switch position engagement allows Section B to be used with the added capabilities of the capacitance found with the bank of condensers 14 as desired. The third mode switch engagement allows the use of Section B alone, which in itself can provide cutting action as well as an infinite variety of finish controls, even to the finest. To provide the cumulative maximum power of the two Sections A & B together, the top switch position is used with both power packs turned on and the maximum capacitance of each circuit placed in operation.

Section B power pack section, having dual maximum and minimum circuitry output capacities allowing a wide range of output variations. Its minimum setting is primarily intended for unusual close fine finish control. This spark generating power pack is very similar to that shown in my co-pending Ser. No. 271,388 application hereinbefore referred to now issued as U.S. Pat. No. 3,763,343. The rectified A.C. power changed to D.C. current is fed to a selective controlled cumulatively additive condenser bank 17 by means of switch 5 through a bridge rectifier 18 and an isolation transformer 19 which in turn is fed by an auto transformer 20. This auto transformer provides a variable voltage output under control of a dial switch 21, essential to even finer finish control of spark action on the work piece. If Section B is not desired in the circuit, it can be switch off. If not needed for power activation, or for economy it can be eliminated or physically removed as it is separately coupled by means of the separable wiring connections.

Section C illustrates diagrammatically the separately housed power input unit. This is so designed for ease of maintenance, interchangeability, or extreme portability. This is represented by the plug 22 feeding Section A through the outlet 23, and feeding Section B through the outlet 24 and the dielectric pump through outlet 25. A main control panel outlet 26 is adapted to mate with plug 26' to feed Section D. The actual connections also include the plug 27 and mating socket 27' in Section A; and a plug 28 and matching socket 28' in Section B.

The main control panel Section D includes principally switch controls and the visual monitoring meter. Included are a switch 30 for controlling the principal power input; a switch 31 to control the arcing power, a dielectric liquid pump switch 32, a vibrator switch 33 and a polarity changing switch 34. An outlet 35 is provided which may be used as an ordinary 110 V outlet for any desired purpose. A meter 39 provides for visual monitoring, as will appear hereinafter.

Section E in the diagram illustrates the principal operating tool of my device which comes in contact with the work piece by means of an electrode. Connections with the power supply for the emitted arc circuit to the electrode 38 are through an outlet 36 and the plug 36' contained in the outlet 36 and plug 36' to another set of contacts here to the vibrator 37.

The mechanical parts of my device are shown in FIGS. 2 through 7. A support cabinet 40 consisting of a housing and a series of racks is designed to hold the component parts of the device. It is understood that this method of mounting allows extreme flexibility of interchangeability, portability, economy in shipping, and ease of maintenance. The positions of the switches and the meter 39 on the main panel D can be seen in FIG. 2. A second panel 41 is also provided to control an electrode advancement causing motor 42 (FIG. 5) adapted to drive a screw threaded stud 43. This stud is threadably engaged with a carrier 44. The carrier 44 in turn carries a vibrator container 45 enclosing the vibrator mechanism which in turn operates the electrode holder 46. The motor 42 may drive the stud 43 through a gear train, belt drive, chain drive or any other suitable mechanism. It will be apparent that a hand drive device such as a crank or handwheel could readily be substituted for the motor drive, or that by means of proper clutch arrangements, well within the mechanical skill of the ordinary mechanic, a hand drive could be added to the motor drive as an auxiliary drive.

One form of the controls for the motor 42 include an on-off switch 47 (FIG. 2) and a potentiometer 48 for speed control. A reversing switch 49 is also provided so that the motor can be used to both advance and retract the electrode.

Figure 2:
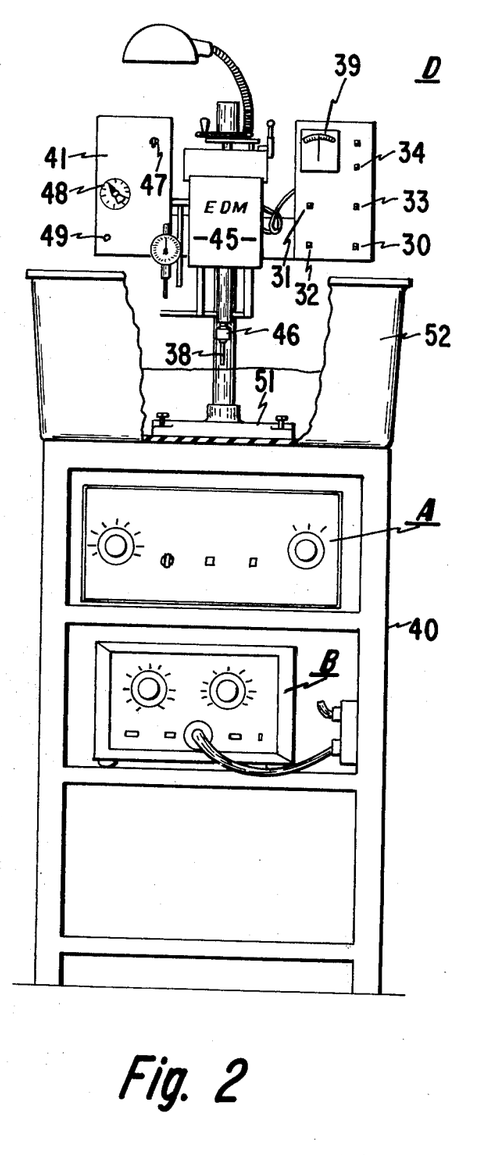
FIG. 2 is a front elevational view of my device mounted on its cabinet support stand with a part of the work tank broken away to show the underlying parts.
Figure 3:
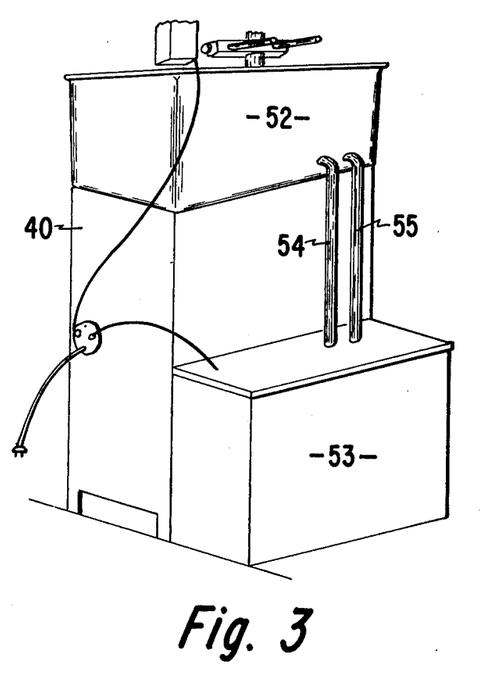
FIG. 3 is a prospective view from the rear of the device particularly showing the dielectric tank and its associated means.

The entire assembly of control panels and electrode holder and vibrator carrying means is mounted on a support 50 (FIG. 5) on a base 51 (FIG. 2). This base 51 stands in the work tank 52 on top of the cabinet stand 40. Both power pack A and power pack B also stand on shelves in the stand 40, and are connected with the control panel D by suitable plugs, outlets, and connecting cords.

Figure 4:
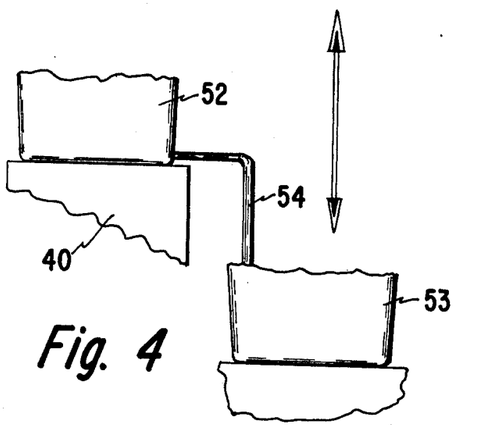
FIG. 4 is a partial and elevational view of an auxilliary dielectric storage tank showing how by gravity and vertical motion of its relation to the work tank, the liquid level can be quickly drained from the work tank and similarly quickly refilled.

When the dielectric fluid is desired to cover the emitted arc for spark erosion of metal, it may be circulated in the tank 52 from a reservoir 53 by means of a submersible pump (not shown) through Tubes 54 and 55. As an alternative or in addition, the reservoir may be mounted for vertical motion, as shown in FIG. 4. The tubes 54 and 55 should then be flexible. By raising the reservoir, the fluid can then flow quickly from the reservoir into the tank 52, or from the tank into the reservoir as the reservoir is lowered. This allows quick work piece interchangeability and faster "floor to floor" time for the work.

Figure 5:
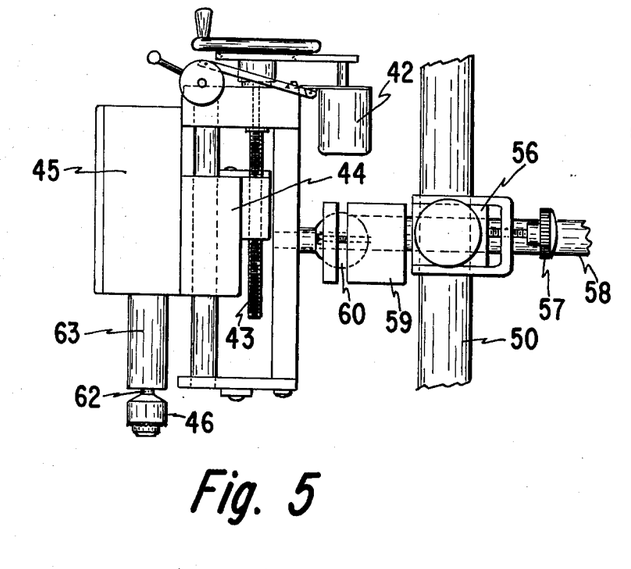
FIG. 5 is a side elevational view of the work head separated from other parts and to an enlarged scale.
Figure 6:
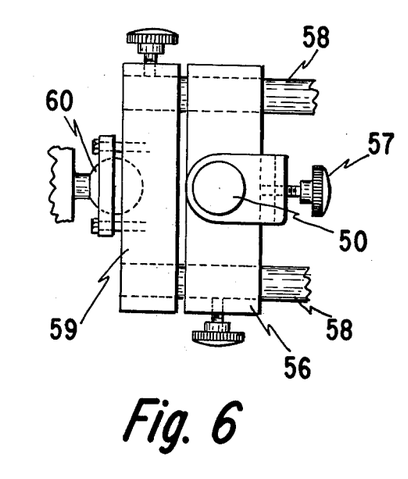
FIG. 6 is a plan view of electrode housing support frame apart from surrounding parts to an enlarged scale showing various means of axis, swivel, and angularity electrode position adjustment.

The mounting of the tool mechanism is best shown in FIGS. 5 and 6. A bracket means for vertically adjusting the work head including an electrically insulating material bar 56 is adjustably mounted on the support 50, and held in place by a clamping screw 57. Horizontal adjustment for the work head may be achieved by the use of sliding bars 58 carrying a mounting pad 59 to which the carrier is mounted through a ball and socket joint 60 allowing angularity to be imparted to the electrode feed support mechanism.

Figure 7:
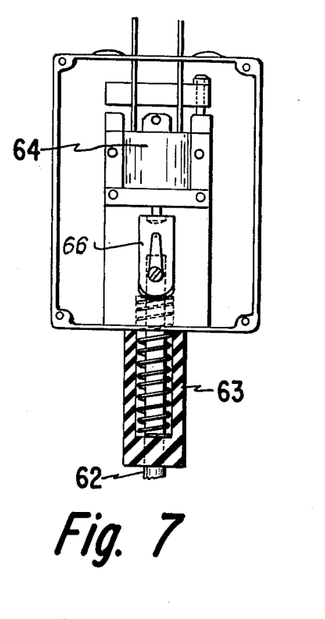
FIG. 7 is an elevational view within the vibrator housing to an enlarged scale.

The electrode holder 46 is supported in a post 62 within an insulator guide 63. A solenoid 64 operating as a vibrator motor causes the holder 46 to be vibrated when operated. Proper insulation precautions are taken so that the charge placed on the electrode is not transmitted to any other part of the machine. Among the precautions is the use of an insulating guide 66 which also acts as the insulating holder for the electrical connecting means to make contact with the conductive support 62 for the emitted electrical charge to be transmitted to the electrode. The vibrating action of the tool 62 is separately powered and insulated.

In use, as an eroding machine, the work piece is fastened in place on the base 51 in the work tank 52 beneath the electrode 38 and the dielectric liquid to cover the arcing of the electrode is pumped into the tank by means of the pump switch 32. In the tank a variable height adjustment for the overflow to the reservoir is incorporated to maintain the proper liquid level for working. A work clamp 65 (shown graphically in FIG. 1) must be clamped to the work to complete the electrical charge circuit. The proper mode of operation may then be selected by use of the switch 15 so that either power pack A, power pack B, or both will feed the electrode. This selection may be governed by the type of operation being performed or the material being worked on. The electrode 38 is then advanced toward the work. Ordinarily, the vibrator mechanism will be operating, but this may not be necesary for all types of work.

For use as a surface metal treating tool the work tank 52 does not utilize the dielectric fluid. In this manner, the electrode 38 charge normally is positive and the stand 51 charge will be negative, and the stand can be separately mounted away from the work tank, on a bench, etc. as it will be grounded. As explained before, for surface treatment automatically, various means of powered axial movement can be imparted to the work head, or the work can be rotated or moved laterally in various fashions for proper surface treatment. Similarly, the electrode can be rotated, oscillated, or otherwise activated to achieve the same or similar results.

As the electrode begins to make contact with the work piece, the condenser banks in the power pack discharge through the electrode causing arcing. As this happens, the meter 39 indicates a certain level of flow of current or voltage drop. By using the handwheel feed screw to keep this meter reading at an optimum position, the work can be kept going at the best rate of feed. By use of D.C. motor controls, the same type of automatic feed could be set up for controlling the feed motor 42.

It should be noted that the vibrator, its feed controls, etc. because of the insulator bar 56, can be readily removed from the support 50. By properly positioning this support, the device could be made so that the bracket 56 will also fit the spindle on a drill press, vertical milling machine or the like. Since the power units are also readily removable from the stand, simply by disconnecting plugs from sockets and longer cords inserted, it will be seen that the device is easily portable and can be used in locations other than that of the cabinet stand 40.

Thus, a relatively flexible device with an inexpensive and easily controlled feed mechanism is provided.

In FIG. 8 a current sensing means of controlling the motor is shown as an alternate method of varying the feed, the motor relating to the arcing action of the electrode.

This unit is supplied A.C. power by transformer 67 which is rectified by a bridge rectifier 68, filtered by a capacitor 69, and controlled by a transistor 70.

The output of the power supply is sensed from resistor 71 by Zenor diode 72 and transistor 73. If the output voltage exceeds Zenor 72, current flows through rectifier 68 to emitter of transistor 70 and collector of transistor 73 approaches ground potential. Thus bringing the base of transistor 73 towards ground potential and increasing the voltage drop from collector to emitter on transistor 70. (Resistor 74 is a leakage resistor.)

The inverse of the above paragraph is true if the voltage goes below output limits.

The current sensing portion of the responsive related powering unit is accomplished with diode 75 and capacitor 76.

The power current from power packs at 87 and 88 flows through diode 75 and capacitor 76 thus causing a voltage drop across resistor 77. Since this is a high pulsing voltage drop, capacitor 76 is used for filtering.

The sensitivity of the responsive related powering unit is varied by resistance 77. Switch 78 across diode 75, when closed, prevents any drop across diode 75 so the total voltage felt across resistance 77 is now that of capcitor 76. If a high potential capacitor on the base of transistor 79, transistor 79 is turned on and the collector of transistor 79 if brought toward ground potential—thus bringing resistance 89 toward ground potential—thus turning transistor 80 on and lowering the voltage drop between collector and emitter of transistor 80. This creates a voltage drop across resistor 81 which puts a positive voltage on the base of transistor 82 through resistor 83. With the base of transistor 82 at a positive potential the voltage of the collector transistor 82 is brought to a lower positive potential. This brings the voltage on the cathode of Zenor diode 90 below or toward its minimum Zenor voltage, thus bringing the collector to emitter voltage of transistor 84 up and decreasing the voltage drop across the motor 86.

85 is used to reverse the polarity of the D.C. motor 86.

FIG. 9 shows how an alternate electrical circuit can be used separately as a component to power the motor through a different sensing action. This would be a separate unit and replace both the motor control drive 41 and the control box D. It would have combined with it all of the function switches 30, 31, 32, 33, 34, motor potentiometer control, and meter 39 in one unit. This will control the rate of feed and arcing action of the electrode in contact with the work piece for optimum operation.

The direct current input is fed across the voltage divider network. The 20 ohm resistor 103 is variable and set at value such that the direct current reversible motor 91 receives a maximum voltage (15–20 volts). The 100 ohm, 100 watt variable resistor 92 in coordination with the 50 ohm resistor 93 and the 20 ohm resistor 103 is set at a value such that there is a 6 voltage drop across the relay coil 94. This 6 volts is sufficient to activate the relay 94. The activation of the relay 94 completes the circuit between resistor 90 and the 12 volts D.C. speed reduction motor 91. The motor 91 rotates driving the electrode of the electronic discharge machine down. As the electrode 95 begins to arc with the work piece, there is a smaller voltage drop across the resistance network. Hence, the voltage drop across the 20 ohm resistor 103 becomes smaller causing the motor to slow down. If the electrode 95 and the work piece 96 should become directly shorted, there would be no voltage across the resistance network. Hence, the relay 94 would drop out. When the relay 94 drops out, the relay contacts connect the motor 91 to a constant D.C. voltage supplied to it by a step down transformer 97 and a rectifying current bridge 98. This D.C. voltage is of the opposite polarity to that across the resistor 103. This polarity change causes the motor 91 to rotate in the opposite direction to break the short between the electrode 95 and the work piece. As this happens, the advancing rotation of the motor again recurs and the down drive continues.

The circuit is also complimented with two indicator lights, 99 and 100, one (99) of which will light when the motor 91 is driving the electrode down and the other (100) will light when the motor 91 is driving the electrode up. Another indicator light 101 shows when the circuit is operating and the fan 102 is connected to cool the power resistors 103, 92, and 93.

As this invention may be embodied in several forms without departing from the essential characteristics thereof, the present embodiment is therefore illustrative and not restrictive.

What is claimed is:
1. An electrical discharge machining apparatus for spark discharge treatment of a workpiece comprising:
   a. a workpiece;
   b. an electrode;
   c. individual and separate units, electrically isolated from each other and including a main power supply unit, a first capacitor power pack generating unit, a second capacitor power pack generating unit, a control panel unit, an electrode positioning unit, and electrical cable connection means to selectively interconnect said units;
   d. said first capacitor power pack generating unit comprising capacitor discharge power supply means connected between said electrode and said workpiece to provide said spark discharge and including at least one bank of a plurality of individual capacitors, switch means to selectively connect said bank of capacitors between said electrode and said workpiece, storage capacitor means to provide a sizable reservoir capacitive source to constantly charge said bank of capacitors;
   e. said electrode a positioning unit including spark discharge sensing means to monitor the condition of said spark discharge between said electrode and said workpiece; and,
   f. said electrode positioning unit further including means to move the electrode toward and away from the workpiece in response to said spark discharge sensing means.

2. The device of claim 1 wherein said spark discharge sensing means includes an electrical meter.

3. The device of claim 1 in which said spark discharge sensing means includes an electro-mechanical means for monitoring the spark discharge between the electrode and the workpiece and motor means electrically connected to said electromechanical means, said motor means being adapted to control the position of the electrode.

4. The device of claim 3 in which said electromechanical control means includes a voltage sensing relay for electrically reflecting the electrode position with respect to the workpiece.

5. The device of claim 4 in which said sensing relay is connected to a motor for variable positioning of the electrode in relation to the workpiece.

6. The device of claim 3 in which said spark discharge sensing means includes a bridge resistance system to sense working variations and in which means for varying the electrode position with the workpiece is controlled by said resistance system.

7. The device of claim 6 in which said means for varying the electrode position includes a motor to adjust the electrode in response to indication received from controls activated by voltage sensing relays and by said bridge resistance system reflecting the condition of the spark discharge relative to the workpiece and the electrode.

8. The device of claim 1 in which said spark discharge sensing means includes opto-electronic means, and electrode control means connected to said opto-electronic means for control thereby.

9. The device of claim 1 in which universal mounting means is provided to support said electrode positioning unit relative to said workpiece so tht the axis of the electrode in reference to the workpiece can be universally adjusted for required various positions, angles, motions, and working conditions.

10. The device of claim 9 in which the universal mounting means is electrically insulated so that the electrode charge polarity can be changed to allow negative or positive charges to be emitted from the electrode or the workpiece.

11. The device of claim 1 in which means to provide electrical mechanical vibrating action is used to activate the electrode.

12. The device of claim 1 in which said second capacitor power pack unit is selectably engageable with said first capacitor power pack unit and said electrode to provide added capacity for control of quantity and quality of the work being performed.

13. The device of claim 12 in which said second capacitor power unit includes a variable switch means to variably and selectively control the usable capacitance to provide added flexibility of control.

14. The device of claim 1 in which said spark discharge takes place in the environment of a dielectric.

* * * * *

UNITED STATES PATENT AND TRADEMARK OFFICE
CERTIFICATE OF CORRECTION

PATENT NO. : 3,969,601

DATED : July 13, 1976

INVENTOR(S) : Isadore J. Rocklin

It is certified that error appears in the above-identified patent and that said Letters Patent are hereby corrected as shown below:

column 1, line 36.
omit "5 x 67" on the top line of the formula.
insert --$C(mfd.)E^2$-- on the top line of the formula.

Signed and Sealed this

Twenty-first Day of November 1978

[SEAL]

Attest:

RUTH C. MASON
Attesting Officer

DONALD W. BANNER
Commissioner of Patents and Trademarks